Patented May 15, 1951

2,553,224

UNITED STATES PATENT OFFICE 2,553,224

TREATMENT OF DRILLING FLUIDS

Truman B. Wayne, Houston, Tex.

No Drawing. Application September 20, 1948,
Serial No. 50,016

10 Claims. (Cl. 252—8.5)

This invention relates generally to the treatment of mud-laden or drilling fluids, and particularly to the treatment of such fluids as are employed in the rotary drilling of oil and gas wells so as to improve the physical properties of said fluids. This application was copending with application Serial No. 277,564, filed June 5, 1939, now Patent No. 2,452,021, patented October 19, 1948.

The fluid employed for rotary drilling operations and which is also called a "drilling mud" and a "mud-laden fluid," may be made from the natural clay which occurs at the location or may be synthetically compounded from the clay and mud bases of commerce, including bentonite and beidellite. Such a fluid therefore contains a gel-forming constituent which is generally bentonitic in its nature. Such fluids may also contain a heavy substance such as barytes, iron oxide, or the like, for increasing the specific gravity of the fluid. Such a fluid is herein designated, descriptively, as an "aqueous well drilling fluid."

Such fluids as are synthetically compounded may be controlled as to viscosity by a proper variation of the colloidal or gel-forming content, but when the cuttings from the bore hole become entrained in the fluid, its composition has changed, and further control is often necessary in order to maintain the desired viscosity but at the same time to permit the cuttings to settle out and render the fluid of such character that it will not be susceptible to gas cutting. With fluids which are compounded with the clay at the location, it is obvious that such control is more difficult. Furthermore, it is sometimes desirable to reduce the viscosity of drilling fluids initially.

The colloidal fractions of bentonite, as well as those of various clays obtained from widely different locations, are quite similar in their composition with respect to silica, alumina, and iron, the main deviation only being from 10 to 15 per cent of the average of each of these substances. The differences in properties exhibited by mud-laden or drilling fluids prepared from clays and clayey materials obtained from various sources are largely due to varying proportions of calcium and/or magnesium present in the colloidal fraction and to the larger proportion of non-colloidal inert material contained in the same clayey suspension. In all cases these gel substances are complex hydrous silicates containing considerable proportions of aluminum and, in fact, may be classed either as hydrous alumino-silicates or in some instances hydrous silico-aluminates. Such substances invariably contain appreciable quantities of calcium and/or magnesium in their composition and it has been observed that the corresponding sodium or potassium compound does not possess the same degree of gelatinous properties and the accompanying high viscosity that is associated with the corresponding alkali-earth bearing hydrous silicates.

One of the objects of this invention therefore is to provide a process of controlling the characteristics of a mud-laden drilling fluid of the character described.

Another object is to provide a mud-laden drilling fluid of the character described which has improved properties.

Further objects will appear from the following description in which will be set forth a number of embodiments of this invention; it will be understood that this invention is susceptible of various embodiments within the scope of the appended claims.

Generally stated and in accordance with an illustrative embodiment of this invention, a drilling fluid of the character described is treated with a stannate, alone or with a lyophile colloid, to attain a drilling viscosity, of for example 15–60 centipoises Stormer. The stannate, alone or with the lyophile colloid is added to the drilling fluid to maintain the same at such a viscosity.

The tests described in the following examples were conducted on well drilling fluids prepared largely from Wyoming bentonites and water so as to have a maximum content of the hydrous aluminum silicates which are reacted upon in the manner herein described. Drilling fluids prepared from natural clays and shales usually encountered during drilling operations are similarly acted upon, since in all cases the colloidal fractions of such materials are quite similar in composition and properties to the purer colloidal gel-forming material, bentonite.

Examples

The water soluble alkali-metal or ammonium stannates are suitable degelling agents, especially when used in conjunction with a lyophile colloid.

As an example thereof, a drilling fluid was prepared containing 8 per cent of Wyoming bentonite by weight. The initial viscosity was 33 centipoises. A 200 ml. sample of this drilling fluid was treated with 0.04 g. of sodium stannate, $Na_2SnO_3 \cdot 3H_2O$, as a 10 per cent aqueous solution. The viscosity was reduced to 25 centipoises.

To another 200 ml. sample of the same drilling fluid were added 0.04 g. of sodium stannate and 0.2 of dry chestnut extract (66% tannins) in concentrated aqueous solution. The viscosity was reduced to 19 centipoises.

The preceding examples exemplify the use of my improved degeling agents on a normal mud-laden drilling fluid prepared in the usual manner from natural or synthetic mud-making materials. The relatively small proportions disclosed are normally sufficient to obtain a satisfactory treatment. However, if it is desired to add larger quantities of gel-forming materials such as bentonite, it is also necessary to use larger proportions of the treating agent, usually from 0.5 to 2.5 per cent, or even higher, based on the weight of the drilling fluid. The excess of treating agent reduces the gel-forming properties of the excess bentonite or other material added, and thus allows larger proportions of gel-forming material to water than normally can be incorporated in the drilling fluid. For instance, wherein a normal 8 per cent suspension of bentonite in water may have a viscosity of 48 centipoises in the Stormer viscosimeter at 600 R. P. M. if the drilling fluid contains as much as 2 per cent of the treating agent, very much larger quantities of bentonite may be incorporated without unduly increasing the viscosity. In fact, fluid muds may thus be prepared from bentonite which approximate the solids composition of muds prepared from natural sources.

It is likewise obvious that muds which have become contaminated with cement, calcareous shales, and/or other sources of polyvalent metal compounds which have produced abnormal viscosities, will require heavier treatment with my improved treating agent to produce normal viscosities for muds so contaminated.

Where water is employed to thin or reduce the viscosity of a drilling fluid, large percentages of water as related to the drilling fluid are required to effect such result. In the treatment of a drilling fluid with a chemical agent or compound, however, comparatively small percentages are required to secure comparable results. It has also been known that adding a chemical to a drilling fluid would initially cause a thinning and then thickening by over-treatment. It was also known that the action of a given chemical on different drilling fluids was different; the practice of performing preliminary experiments or trials or preliminary try-outs, particularly in the laboratory, with a chemical on a drilling fluid, before a full scale try-out in a well, was therefore resorted to. It was also known that the viscosity of a drilling fluid was increased by contamination by calcium compounds occurring in the drilling fluids or in the formations being drilled. It was therefore the practice to add a chemical in amounts, based not on a percentage as related to the drilling fluid, but determined by the character of the drilling fluid and according to the nature of the strata being drilled. In the drilling of a well, the practice has been to take viscosity measurements and to add the chemical in amounts required to correct the viscosity.

The above tests as related to the various poly-derivatives disclosed, are of course laboratory tests, made in order to show the comparative efficiencies of the various agents enumerated in the treatment of drilling fluids. In the actual treatment of drilling fluids, the procedure is not one of using a given proportion or percentage of the treating agent with reference to the drilling fluid; the treatment is one of adjusting the viscosity of the drilling fluid by the addition of the treating agent. This will be apparent when we consider the fact that during the course of drilling a formation which may contain salts, cement, or cuttings, generally the viscosity will be affected by the addition of these formation ingredients. The water used in the making of the drilling fluid, the temperature at the bottom of the well (which, in some wells, may be above the boiling point of water), and other conditions also affect the viscosity of the drilling fluid. The practical procedure, therefore, is to add the treating agent in accordance with the requirements in order to secure the desired viscosity and thixotropic properties and, in general, the desired reduction of the viscosity of a drilling fluid which has become contaminated by the ingredients of the formation.

Having thus described the invention, what is claimed and desired to be secured by Letters Patent is:

1. In the art of drilling wells by the employment of an aqueous drilling fluid of the character described, the process comprising, treating such a drilling fluid during the course of drilling with sufficient of an alkali-metal stannate to maintain the fluid at a drilling viscosity.

2. An aqueous well drilling fluid of the character described, containing sufficient of an alkali-metal stannate to attain a drilling viscosity.

3. In the art of drilling wells by the employment of an aqueous drilling fluid of the character described, the process comprising, treating such a drilling fluid during the course of drilling with sufficient of an alkali-metal stannate and of a lyophile colloid to maintain the fluid at a drilling viscosity.

4. An aqueous well drilling fluid of the character described, containing sufficient of an alkali-metal stannate and of a lyophile colloid to attain a drilling viscosity.

5. The method of conditioning a mud-laden drilling fluid comprising an aqueous colloidal dispersion, to control the viscosity and other properties thereof during the circulation of the fluid for well drilling through clay and shale which tend to deflocculate and accumulate in the fluid stream, thereby to objectionably increase the viscosity thereof, which comprises treating the fluid with an alkali metal stannate in a proportion to give an initial viscosity reduction.

6. The method according to claim 5 with the added step of treating the fluid with a lyophile colloid.

7. An aqueous mud-laden drilling fluid containing an effective amount, up to about 2 pounds per 42 gallons of fluid, of an alkali metal stannate substantially to reduce viscosity and to maintain reduced viscosity at temperatures encountered in well drilling.

8. An aqueous mud-laden drilling fluid containing an effective amount, up to about 2 pounds per 42 gallons of fluid, of an alkali metal stannate and a lyophile colloid substantially to reduce viscosity and to maintain reduced viscosity at temperatures encountered in well drilling.

9. An aqueous mud-laden drilling fluid containing an effective amount, up to about 2 pounds per 42 gallons of fluid, of sodium stannate substantially to reduce viscosity and to maintain reduced viscosity at tempeartures encountered in well drilling.

10. An aqueous mud-laden drilling fluid containing an effective amount, up to about 2 pounds per 42 gallons of fluid, of sodium stannate and a lyophile colloid substantially to reduce viscosity and to maintain reduced viscosity and gel strength values at temperatures encountered in well drilling.

TRUMAN B. WAYNE.

REFERENCES CITED

The following references are of record in the file of this patent:

UNITED STATES PATENTS

| Number | Name | Date |
|---|---|---|
| 2,315,995 | Williams | Apr. 6, 1943 |
| 2,450,936 | Cardwell | Oct. 12, 1948 |
| 2,452,021 | Wayne | Oct. 19, 1948 |